United States Patent [19]

Kriger

[11] 4,245,213

[45] Jan. 13, 1981

[54] SECURITY SYSTEM

[76] Inventor: Igor Kriger, 5030 N. Marine Dr., #708, Chicago, Ill. 60640

[21] Appl. No.: 68,053

[22] Filed: Aug. 20, 1979

[51] Int. Cl.³ .......................... H04Q 3/00; G06K 9/00

[52] U.S. Cl. ............................ 340/149 A; 340/149 R; 340/543; 340/146.3 AG

[58] Field of Search .... 340/149 R, 149 A, 146.3 AG, 340/543; 358/108, 6

[56] References Cited

U.S. PATENT DOCUMENTS 4,006,459 2/1977 Baker .............................. 340/149 A

*Primary Examiner*—Harold I. Pitts

*Attorney, Agent, or Firm*—Hill, Van Santen, Steadman, Chiara & Simpson

[57] ABSTRACT

A security system includes apparatus for producing a pair of identical keys in the form of photographs of a kaleidoscopic image. One photograph is retained in the system and upon introduction of another photograph back into the system, the images thereon are compared and employed to sound an alarm if the introduced photograph is not the same as the stored photograph or to open a door in response to a favorable comparison of the images. In either case, inasmuch as kaleidoscopic images are substantially unique, the photographs become garbaged and are dumped into a bin.

17 Claims, 6 Drawing Figures

FIG. 5
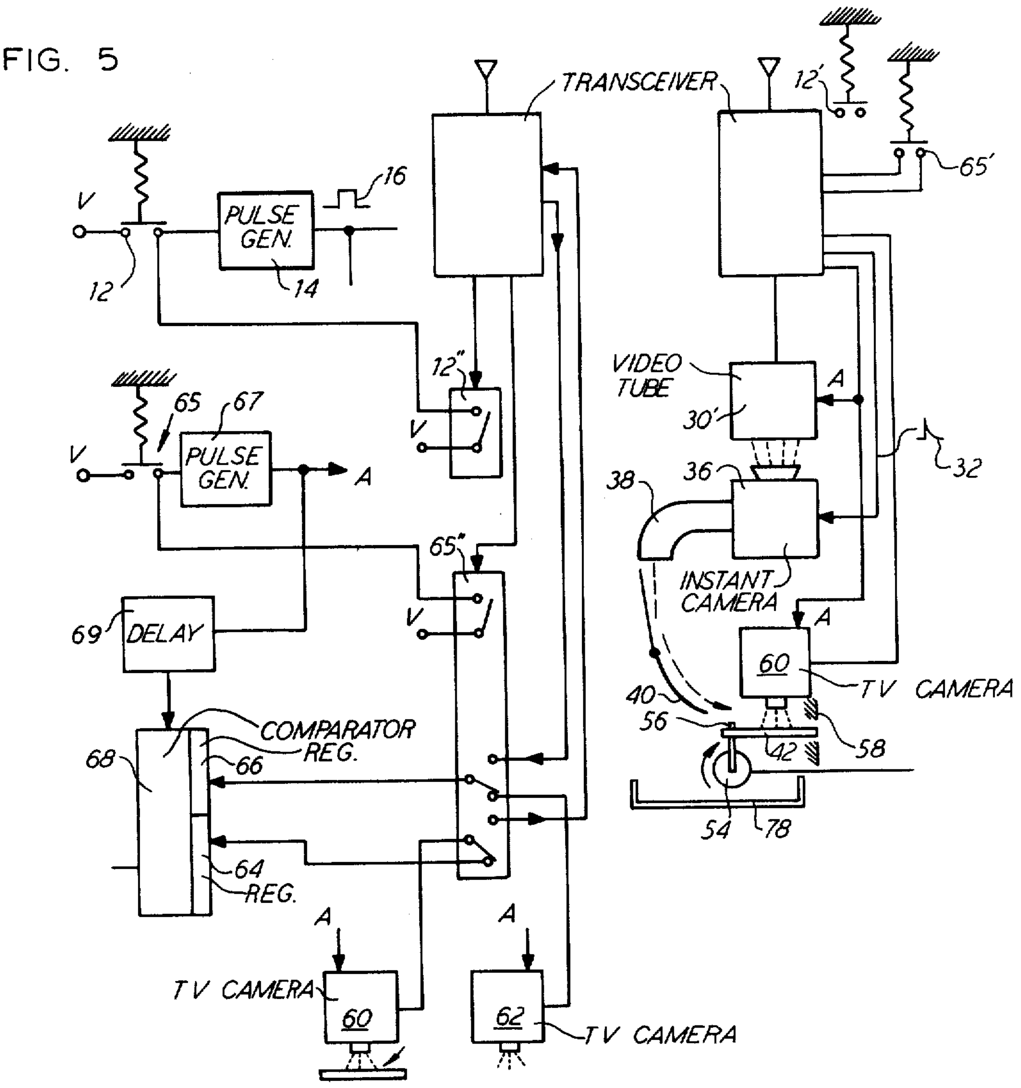
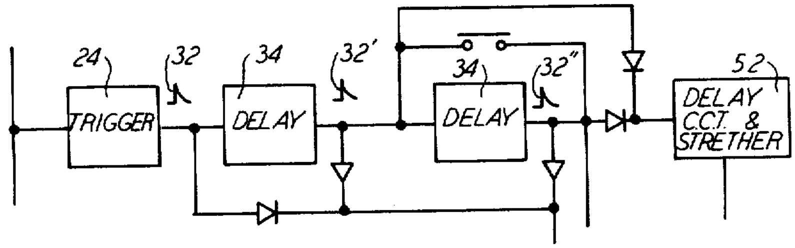
FIG. 6

SECURITY SYSTEM

BACKGROUND OF THE INVENTION

1. Field of the Invention

The present invention relates to a security system for controlling the opening of a door or the like, or the emission of an alarm, and more particularly to such a system which utilizes keys on the form of photographs of a kaleidoscopic image.

2. Description of the Prior Art

There are many key systems known in the art which employ magnetic readers or optical readers and compare the read characters to store data in order to provide or prevent access to a restricted area by way of a door, drawer or the like. The term "door" as used herein is intended to cover all types of doors, drawers, sliding panels, etc, the closure of which prevents access to a given area.

SUMMARY OF THE INVENTION

The object of the present invention is to provide a new and improved security system in which the access data stored in the system is unique for each closure operation and is only temporarily stored from the time of closure until the time of access or an attempt of access.

According to the invention, upon activation of a door closing apparatus, a kaleidoscope is driven a predetermined amount so as to produce a unique kaleidoscopic image. A camera of the type which utilizes self-developing film is then triggered twice to produce two identical photographs of the kaleidoscopic image. One of these photographs is guided to a support adjacent a first television camera and the other photograph is delivered outside of the system to the person who has initiated closure of the door. Upon reintroduction of the second photograph to a point adjacent a second television camera, both television cameras are activated to scan the photographs and emit the results to a comparator which causes the door operating apparatus to open the door. In the event that the photograph does not agree with the stored photograph, the comparator prevents opening of the door and causes activation of an alarm. The comparator also causes both photographs to be dumped into a bin as garbage in response to an access or an alarm condition.

According to another embodiment of the invention, a single rotatably mounted television camera may be employed and rotated to view one photograph and then the other.

According to another embodiment of the invention, a single television camera is employed and the supports for the photographs are rotatably mounted so as to position one photograph adjacent the television camera and then the other photograph adjacent the television camera.

According to another embodiment of the invention, and given a plurality of restricted areas, each protected by its own system, and given the situation that a key for one of the areas becomes lost, proper authorized access to another of the areas can provide authorized access to the area in question by linking the door operating apparatus of all the areas through respective switches so that operation of the switch assigned to the system in question in any accessed area, will cause opening of the door and dumping of the stored photograph.

According to another embodiment of the invention the system may be operated from a remote location utilizing suitable radio or high frequency transmission between the base and remote stations.

BRIEF DESCRIPTION OF THE DRAWING

Other objects, features and advantages of the invention, its organization, construction and operation will be best understood from the following description, taken in conjunction with the accompanying drawings, on which;

FIG. 5 is a schematic circuit diagram illustrating circuit details for remote operation of the system of FIG. 1; and FIG. 6 is a schematic circuit diagram illustrating circuit details for providing more than one key photograph.

DESCRIPTION OF THE PREFERRED EMBODIMENTS

Figure 1:
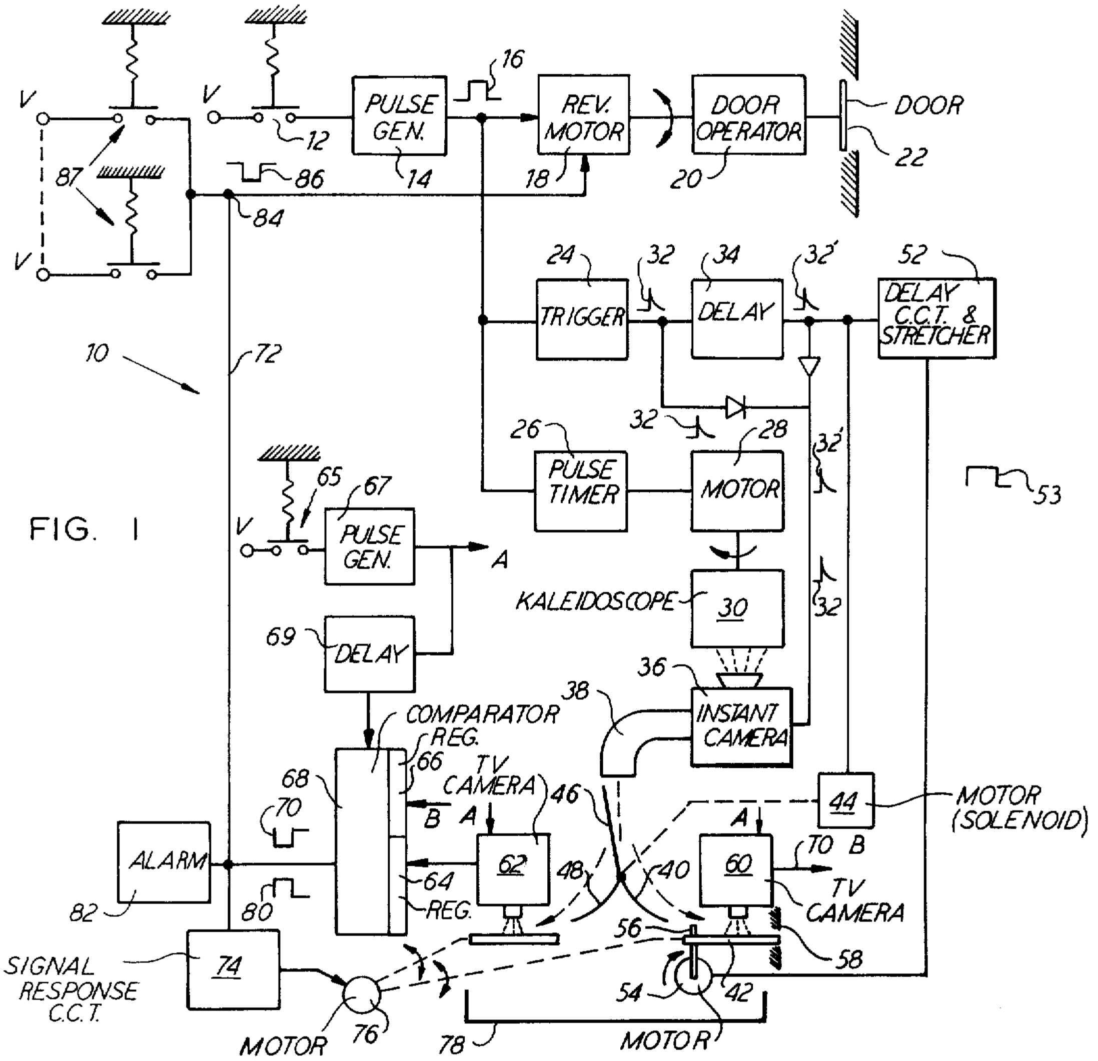
FIG. 1 is a schematic circuit diagram of a security system constructed in accordance with the principles of the present invention.

Referring to FIG. 1, a security system constructed in accordance with the present invention is generally illustrated at 10 as comprising a switch 12, preferably a spring-loaded push button, is operable to trigger a pulse generator 14 to produce a pulse 16 which has a duration sufficient to cause a reversible motor 18 to operate a door operator 20 in a first direction to close a door 22. The pulse 16 is also utilized to drive a motor 28 for a predetermined time so that a kaleidoscope 30 is operated to present a unique kaleidoscopic image. A timing circuit 26 may be interposed between the pulse generator 14 and the motor 28 in order to convert the pulse 16 into a pulse of a different width.

The pulse 16 also operates a trigger circuit 24 to produce a trigger pulse 32 which is employed to trigger an instant camera 36 which takes a first self-developing picture of the kaleidoscopic image and ejects the same to a chute 38 which, together with a guide member 40 and a door 46 guides the first photograph to a support 42. The pulse 32 is also delayed by a delay circuit 34 and emerges therefrom as a delay pulse 32' which triggers the instant camera 36 a second time. The pulse 32' also energizes a motor 44, a spring-biased solenoid, to move the door 46 to its broken-line position. The second photograph ejected by the camera 36 is guided by the chute 38, together with the door 46 and a guide member 48 to a position on a support 50 where the same is stored, image side up, adjacent a television camera 62. It should be noted that with the particular apparatus illustrated, the first photograph is deposited on the support 42 image side down and must be reintroduced into this particular structure image side up.

The delayed pulse 32' is also delayed again by a delay circuit 52 and is reformed into a pulse 53 which is of a duration sufficient to operate a motor 54 through a single revolution so as to move the arm 56 to the right and eject the first photograph from the system through a slot 58. It should be noted that the motor 54 could also be a solenoid and the arm 56 a spring-biased arm.

Upon introduction of a photograph into the system through the slot 58, and manual depression of a switch 65, or tripping of such a switch by entry of the photograph, a pulse generator 67 is triggered to produce a pulse A of the duration which is sufficient to enable each of the television cameras 60 and 62 to scan the respective pictures and present the scanned information to a comparator 68, which may include a pair of registers 64 and 66. The pulse A is also fed to a delay circuit 69 to produce a pulse A' which causes the results of the signal comparison to be output as a pulse 70 or as a pulse 80. The pulse 70 is of a polarity to drive the reversible motor 18 in the opposite direction, and of a width sufficient to cause the motor to completely open the door 22. This condition, of course, only results when the first photograph is reintroduced into the system as a proper access key and therefore agrees in image content with the second photograph resting on the support 50.

The pulse 80, however, is of an opposite polarity and is ignored by the reversible motor 18, but causes activation of an alarm 82, which may be a silent alarm, an audible alarm, or a combination of alarms at the site or at a remote security console.

Inasmuch as each kaleidoscopic image is unique and the odds against producing the same kaleidoscopic image is great, and increases in respect of the number of mirrors employed in the kaleidoscope, each of the photographs become useless and are therefore dumped, as garbage, into a collection bin 78, which may also include apparatus for delivering the same to a shredder, incinerator or the like. This function is accomplished by pivotally mounting the supports 42 and 50 and by pivoting the supports to permit the photographs to slide off. In order to accomplish the pivoting movement, a signal response circuit 74 is provided which is responsive to the pulse 70 or the pulse 80 to operate a motor 76 which is mechanically linked to the supports 42 and 50. It should be pointed out that the motor 76 may also taken the form of a solenoid, with the supports 42 and 50 being spring-biased to the illustrated positions.

It will be appreciated that the kaleidoscope thus produces a collage-type image of a plurality of non-selectively randomly positionable object, from which a master security content, i.e. the first photograph, is produced and at least one additional photograph constituting a corresponding key security content.

Figure 2:
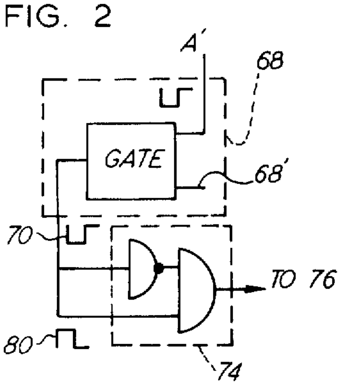
FIG. 2 is a schematic circuit diagram illustrating a possible circuit arrangement for operating the dumping mechanism.

There may be many possible designs for the signal response circuit 74. One such design is schematically illustrated in FIG. 2. The output portion of the comparator 68 is illustrated as comprising an output gate having the comparison information 68' presented thereto and gated through as the pulse 70 or the pulse 80 to the input of the signal response circuit 74. The signal response circuit 74 presents the output pulse 70, or the output pulse 80 to an inverter and to an OR gate. The OR gate, therefore, responds to either of the pulses to produce a signal for operating the motor 76.

Figure 3:
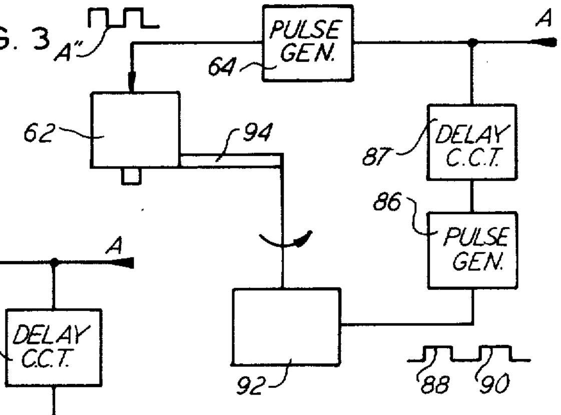
FIG. 3 is a schematic circuit diagram of a portion of the system of FIG. 1 adapted for using a single television camera.

Referring to FIG. 3, a single television camera may be employed by rotatably mounting the camera, for example the camera 62, on a support 94 for rotation by a motor 92. In this embodiment, the signal A is fed to a pair of pulse generators 85 and 86. The pulse generator 85 provides a time-spaced pulses A'', the first of which operates the television camera 62 for a first scan of one of the photographs and the second of which operates the television camera 62 for a second scan of the second photograph. The pulse generator 86 also produces a pair of time-spaced pulses 87 and 88, each of which are sufficient to drive the motor an amount to rotate the television camera 62 180°. Inasmuch as the television camera should be returned to its initial position, and as the operation here must follow the sequence of scan-rotate-scan-rotate, a delay circuit 89 is interposed between the pulse generator 67 and the pulse generator 86 so that the pulse A is delayed for an amount which is at least as great as the first scan time. By the same token, the second scanning operation cannot occur until after completion of the rotation, that is until after the pulse 87 has disappeared and the system has reached mechanical stability. Therefore, the pulses A'', 87 and 88 can only be determined with the knowledge of the mechanical dynamics, including the system inertia.

Figure 4:
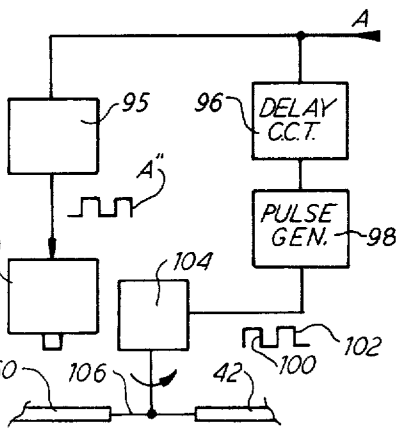
FIG. 4 is a schematic circuit diagram of another embodiment of the invention for using a single television camera.

A faster comparison operation may be had by maintaining the television camera 62 at a fixed location and rotating the two photograph supports 42 and 50. This is illustrated in FIG. 4 in which a motor 104 rotatably mounts a member 106 having the supports 42 and 50 affixed thereto. As in the case of FIG. 3, a pulse generator 95 is triggered by the pulse A' to produce a pair of time-spaced pulses A''. Also, a pulse generator 98 is triggered, via a delay circuit 96 to produce a pair of time-spaced pulses 100 and 102 which are properly phased with respect to the first and second A'' pulses.

It will be appreciated that with the systems of FIGS. 3 and 4, the delay of the pulse A' by the delay circuit 69 must be greater to accommodate the sequence of scan-rotate-scan-rotate, before all of the information is presented to the comparator. Also, with the system of FIGS. 3 and 4, the comparator must be adapted with an electronic switch which is also responsive to pulses, such as the pulses A'', to alternate loading of the registers 64 and 66, or the registers must be connected to load, in parallel, from one register to the next so that two completely loaded registers are available and presenting information to be compared.

Instead of the photo guiding apparatus, photograph ejecting apparatus and the like set forth above, particularly with respect to FIG. 1, pneumatic photo transport apparatus may be employed or, other transport apparatus may be employed, such as is used in bill changing machines or photo copying machines. In addition, the switch 65 may be a photoelectric switch which is operated upon introduction of the photograph through the slot 58. In this case, the photo dumping operation would clear the photo switch for subsequent utilization.

As mentioned above, the question arises as to authorized access when the key photograph is lost. In this connection, reference is again made to FIG. 1 in which a plurality of switches 87 have been provided and connected to a junction 84 which represents a dedicated line for the illustrated system, which may be one of several individual security systems. Assuming only one switch 87, located at a security console or other control location or the like, and upon proper identification to the security personnel, the security officer may actuate a switch 87 and provide a pulse 86 which is equivalent to the pulse 70 and which causes the reversible motor 18 to open the door 22. Such an access switch may be provided for each system being supervised by the security personnel.

Also, assuming several restricted areas, a second switch 87 may be provided in each of the restricted areas and upon proper access to another restricted area, the switch 87 for the illustrated system may be actuated to produce the opening pulse 86. The pulse 86 may therefore be produced by the duration of the closure of the switch 87, or the closure thereof activating a pulse generator (not shown).

FIG. 5 illustrates portions of the circuits of FIG. 1 and additional circuitry for the remote control of the security system at a master station by means of radio transmission from a remote station. In the figure components representing or corresponding to components of FIG. 1 will be correspondingly numbered. The portion of the system corresponding to FIG. 1 constituting the master station (only necessary portions of which are illustrated), is generally designated by the reference numeral 110 while the remote station is generally designated by the reference numeral 111. Each station includes a transceiver, that associated with the master station being designated by the numeral 112 and that associated with the remote station being designated by the reference numeral 113. Each transceiver includes a radio transmitter and a radio receiver (not independently shown), and in dependence upon design considerations may involve the same or different frequencies in the respective transmission directions, employing suitable frequencies for accomplishing the desired functions.

Assuming that the master station 110 is to be responsive to local control as well as to remote control, it will include the corresponding components illustrated in FIG. 1 for local control and, in addition to the transceiver 112, includes suitable switching means 114, 114' and 115 which are actuatable from the transceiver 112 over respective lines 116, 116' and 117 in the presence of suitable signals received by the transceiver 112 from the remote station. The switches 114, 114' and 115 may be of any suitable form, for example suitable relays or semiconductor switches. The switch 114 is provided with merely a single set of contacts 12" which shunt the switch 12 and thus are operative, in the presence of a suitable received signal from the transceiver 113, to initiate the sequence of functions previously described in connection with the switch 12. The switch 114' is provided with contacts 65", which shunt the contacts 65 and is adapted to be closed in the presence of a suitable received signal from remote station 111, supplied over the line 116' with closure of the contacts 65" thus initiating the same sequence of operations described in connection with the closing of the switch 65. Contacts 65 and 65" may be connected with each other in such a way that closing one of them disables closing of another one. This may be required as it provides a possibility to disable operating of full system locally from remote station or vice versa. Switch 115 includes contacts 118 and 119 which are operable to selectively connect the TV cameras 60 and 62 to the registers 66 and 64, respectively, or to selectively connect the respective cameras to the transceiver 112, as hereafter discussed in greater detail.

Associated with the transceiver 113 are respective control contacts 12' and 65' which are operative to suitably control the transmitter portion of the transceiver 113 to enable transmission of respective control signals for the actuation of switches 114 and 114'. The receiver of the transceiver 113 includes video circuits adapted to actuate a video tube 30', the display of which is adapted to be photographed by a cooperable instant camera 36 to produce a photograph, of the image produced by the video tube 30', which is ejected to a chute 38 which, together with the guide member 40, guides the photograph to the support 42.

Operation of the circuit of FIG. 5 is as follows: Assuming that it is desired to activate the system from the remote station 111, the contacts 12' are initially closed resulting in a transmission of a signal to the transceiver 112, whereat the transmitted signal is processed and supplied in suitable form to the switch 114 resulting in the closing of the contacts 12" to initiate action of the system as previously described. Simultaneously with the actuation of the switch 114, the contacts 119 will be switched to connect the TV camera 62 to the transceiver 112 and upon deposit of the picture, from the instant camera 36, in operative position at the TV camera 62, a video picture will be transmitted from the transceiver 112 to the remote station, with the transceiver 113 processing the received signal, and the video tube 30' producing an image of the photograph at the TV camera 62. Such image is subsequently photographed by the instant camera 36 upon receipt of the signal 32 from the master station. The finished photograph, forming the key member, is then delivered from the camera to the slot 58 at which it is ejected. In this instance, where only a single key is to be supplied, the received control signals would also be operative to actuate suitable shunt contacts across the delay circuit 34 to prevent the taking of a second picture. On the other hand, if it is desired to also produce a key for a possible local operation, the second picture would be supplied in the usual manner.

In the event the door is to be opened, by remote control from the remote station, the key member is disposed in the slot 58 and the contacts 65' closed to actuate the circuit controlled by the contacts 65, and simultaneously therewith, the contacts 118 are switched to connect the input B of the comparator 68 to the transceiver. The camera 60 at the remote station then produces a video signal representative of the key photograph which signal is transmitted to the transceiver 112 and supplied, in suitable form, to the input B of the comparator, where it is compared with the image received from the TV camera 62. If the images coincide the door will be opened.

It will be appreciated that a plurality of remote stations may be utilized. Likewise, the remote station could be designed merely for operating the security system to open the door or other object by means of a key which was produced at the master station. In such case the video tube 30' and the camera 36 may be omitted as well as circuitry associated therewith.

It is also possible that it may be desirable, in some applications of the invention, to utilize the same key for a predetermined number of opening operations, or until a new key is desired. In such case, suitable switching means may be provided to prevent dumping or distruction of a key and the master photograph until the desired conditions have been met.

FIG. 6 illustrates a simple circuit for providing several key members instead of merely one. This figure merely illustrates a portion of that of FIG. 1 involving primarily the delay circuit 34. In this embodiment a second delay circuit 34' is provided in series with the delay circuit 34 whereby three pulses 32, 32' and 32" will be transmitted to the camera 36 to thereby provide an extra photograph as a key member. The motor 54 will be accordingly actuated to discharge the key members following each operation of the camera 36. When only a single key member is desired, the second delay circuit may be shunted by contacts 120.

It will also be appreciated that a microprocessor may be substituted for the comparator 68 and register 64, 66 which is programmed to perform the same functions. Likewise, the microprocessor may also perform other functions such as pulse generation, delay calculations, etc., eliminating corresponding individual components.

Although i have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A security system comprising:
first means operable to close an opening;
second means connected to said first means and operable in response to the operation thereof to produce a kaleidoscopic image;
third means connected to said first means are operable in response to the operation thereof to produce first and second identical pictures of the kaleidoscopic image;
fourth means connected to said third means for storing one of said pictures and ejecting the other outside of said system;
fifth means for reading and comparing said one picture and a picture introduced into said system; and
alarm means connected to said fifth means and operable in response to a non-parity condition of the pictures to emit an alarm signal.

2. The system of claim 1, comprising connection means
between said fifth means and said first means operable in response to parity between the pictures to cause said first means to open the opening.

3. A security lock system for alarming a door upon closure of an opening comprising:
switch means;
door operating means connected to said switch means and to the door and responsive to the actuation of said switch means to close the door;
first means connected to said switch means, including first motor means operated for a predetermined interval upon actuation of said switch means, and kaleidoscope means connected to and driven by said first motor means to produce a kaleidoscopic image;
second means connected to said switch means, including a self-developing film type camera facing the kaleidoscopic image and camera actuation means connected between said switch means and said camera and operable to actuate said camera at least two times to produce identical pictures;
a picture support;
picture transport means for transporting at least one of the pictures to said picture support and ejecting any remaining pictures for reintroduction into the system;
image sensing means for reading the picture on the support and a picture introduced onto said picture support and producing respective sets of image signals;
alarm means; and
comparison means connected on one hand to said image sensing means and on the other hand to said alarm means and to said door operating means and responsive to equal sets of image signals to cause opening of the door and to unequal sets of image signals to activate said alarm means.

4. The security lock system of claim 3, wherein:
said door operating means includes a reversible motor and a door operating mechanism connected between said reversible motor and the door, said reversible motor connected to and operated in a first direction by said switch means and connected to and operated in a second direction by said comparison means.

5. The security lock system of claim 3, wherein:
said image sensing means comprises television camera means.

6. The security lock system of claim 3, wherein:
said picture transport means comprises first transport means for transporting one of said pictures to said picture support, second transport means for transporting the other of said pictures to said picture support, and means for ejecting the other of said pictures from said system.

7. The security lock system of claim 3, wherein:
said image sensing means comprises a first television camera and a second television camera for scanning respective ones of said pictures.

8. The security lock system of claim 3, comprising:
means connected between said comparison means and said picture support and operable in response to equal sets of said image signals, or in response to unequal sets of said image signals, to dump the pictures from said picture support; and
comprising a receptacle for receiving the dumped pictures.

9. A security lock system for alarming a door upon closure of an opening, comprising:
first means operable in response to closure of the door, including a kaleidoscope, for producing a unique kaleidoscopic image;
second means responsive to the closing of the door to produce first and second identical pictures of said kaleidoscopic image;
means for receiving and storing a first of said pictures;
means for ejecting a second of said pictures;
means for comparing the stored picture and a picture introduced into said system for image content; and
alarm means connected to said comparison means and responsive to comparison of pictures having unequal image content to emit an alarm signal.

10. The security lock system of claim 9, comprising:
means responsive to said comparison means for operating the first-mentioned means in the opposite direction to open the door in response to a favorable comparison between the two pictures.

11. In a security system for controlling a predetermined operation of means which is to be secured thereby, the combination of
first means for producing a master security content representative of a collage-like image of a plurality of non-selectively randomly positionable objects;
first storage means for storing such content,
means for producing a corresponding key content representative of the same collage-like image;
second storage means for storing said key content;

means disposed to receive both of said stored contents for effecting a comparison therebetween for determining substantial identity of the two contents and operative, in the presence of identity of said contents for providing a signal forming a control criterion for said predetermined operation, said storage means for said key content being in the form of an independent key structure that may be disassociated from the other components, when desired, to thereby render the system inoperable and effect such securement.

12. A security system according to claim 11, comprising in further combination means associated with said plurality of non-selectively randomly positionable objects for agitating the same prior to the production of said master and key contents.

13. A security system according to claim 11, comprising in further combination a radio link connecting said system, as a master station, with a remote station;

and means at the remote station for transmitting to said master station, a facsimile of the key storage content; and means at the master station for supplying the received facsimile, in suitable form, to said comparison means for comparison with the master content at the master station and control of said means to be secured.

14. A security system according to claim 13, comprising in further combination means at the master station for transmitting a facsimile of said master key content to said remote station;

and means at the latter station for storing said facsimile to form an independent key structure.

15. A method of preventing unauthorized operation of means to be secured, comprising the steps of producing a master storage content representative of a collage-like image of a plurality of nonselectively randomly positionable objects;

producing a key storage content representative of the same collage-like image, as a separate independent entity which may be disassociated from said master content and may be handled and transported independently of the master content;

and permitting operation of the means to be secured, only following cooperable association of the master and key contents and establishment of substantial identity therebetween.

16. A method according to claim 15, comprising in further combination the step of agitating said randomly positionable object prior to the production of said master and key contents to provide a fresh unused image for such production.

17. A method according to claim 15, comprising in further combination the step of effecting said cooperable association and establishment of substantial identity between the master content and the key content by a comparison between the master content and a radio-transmitted facsimile of the original key content received from a location remote from the location of said master content.

* * * * *